(12) United States Patent
Lee et al.

(10) Patent No.: US 10,598,065 B2
(45) Date of Patent: Mar. 24, 2020

(54) UREA SOLUTION PUMP MODULE

(71) Applicant: COAVIS, Sejong-si (KR)

(72) Inventors: Tae Hoon Lee, Sejong-si (KR); Ji Ho Jung, Sejong-si (KR); Jong Hyuk Yoon, Sejong-si (KR); Yong Soo Jeon, Sejong-si (KR)

(73) Assignee: COAVIS, Sejong-si (KR)

( * ) Notice: Subject to any disclaimer, the term of this patent is extended or adjusted under 35 U.S.C. 154(b) by 262 days.

(21) Appl. No.: 15/710,119

(22) Filed: Sep. 20, 2017

(65) Prior Publication Data

US 2018/0080361 A1    Mar. 22, 2018

(30) Foreign Application Priority Data

Sep. 21, 2016  (KR) .................. 10-2016-0120482

(51) Int. Cl.
| | |
|---|---|
| *F01N 3/20* | (2006.01) |
| *B01D 35/027* | (2006.01) |
| *B01D 35/26* | (2006.01) |
| *H05B 3/82* | (2006.01) |
| *B60K 15/03* | (2006.01) |

(52) U.S. Cl.
CPC ....... *F01N 3/2066* (2013.01); *B01D 35/0276* (2013.01); *B01D 35/26* (2013.01); *H05B 3/82* (2013.01); *B60K 2015/03348* (2013.01); *F01N 2610/02* (2013.01); *F01N 2610/10* (2013.01); *F01N 2610/1426* (2013.01); *F01N 2610/1433* (2013.01); *F01N 2610/1486* (2013.01); *Y02T 10/24* (2013.01); *Y10T 137/794* (2015.04); *Y10T 137/8085* (2015.04); *Y10T 137/86035* (2015.04)

(58) Field of Classification Search
CPC ......... F01N 2610/1406; F01N 2610/10; F01N 2610/1426; F01N 2610/1433; F01N 2610/1486; F01N 2610/261; F01N 2610/1473; F01N 2610/14; F01N 2900/1811; F01N 2240/16; F01N 3/2013; F01N 3/2066; B60K 2015/03348; Y10T 137/794; Y10T 137/8085; Y10T 137/86035
See application file for complete search history.

(56) References Cited

U.S. PATENT DOCUMENTS

| | | | |
|---|---|---|---|
| 9,089,799 B2 * | 7/2015 | Crary ................. | B01D 35/027 |
| 9,388,725 B2 * | 7/2016 | Ogawa ................ | F01N 3/2066 |
| 2013/0263938 A1 * | 10/2013 | Harr ..................... | F01N 3/2066 137/334 |

(Continued)

FOREIGN PATENT DOCUMENTS

KR    1020140020035 A    2/2014

*Primary Examiner* — Atif H Chaudry
(74) *Attorney, Agent, or Firm* — The Webb Law Firm

(57) ABSTRACT

Provided is a urea solution pump module including: a flange portion coupled to cover an opened mounting hole of a urea solution tank; a pump disposed near an upper surface of the flange portion; a filter formed to surround the pump, disposed to be spaced apart from the pump, and coupled to the flange portion; an internal heater disposed between the pump and the filter and coupled to the flange portion; and a first fin having one side connected to the internal heater and the other side disposed near the pump. If the urea solution received in the urea solution tank is frozen, the pump and the urea solution frozen around the pump may be quickly and efficiently thawed.

6 Claims, 4 Drawing Sheets

(56) References Cited

U.S. PATENT DOCUMENTS

| | | | |
|---|---|---|---|
| 2014/0245726 A1* | 9/2014 | Maguin | F01N 3/2066 60/310 |
| 2017/0107881 A1* | 4/2017 | Bauer | F01N 3/206 |

* cited by examiner

UREA SOLUTION PUMP MODULE

CROSS-REFERENCE TO RELATED APPLICATION

This application claims priority to Korean Patent Application No. 10-2016-0120482 filed Sep. 21, 2016, the disclosure of which is hereby incorporated in its entirety by reference.

TECHNICAL FIELD

The following disclosure relates to a urea solution pump module capable of sucking a urea solution contained in a urea solution tank and sending the urea solution out at a set pressure.

BACKGROUND

As the problem of environmental pollution becomes a major social issue, exhaust gas regulations for internal combustion engine vehicles using fossil fuels are becoming increasingly strict. Particularly, exhaust gas from diesel engine vehicles using diesel fuel, such as buses and trucks contains nitrogen oxide (NOx) which has been turned out as a cause material of acid rain and respiratory illnesses. European emission standards which are applied recently or will be gradually strengthened regulate emission standards of nitrogen oxide more strictly.

In order to cope with such emission standards, a method of reducing nitrogen oxide contained in exhaust gas of a vehicle diesel engine by applying a selective catalytic reduction (SCR) system to a vehicle has been used. The SCR system removes nitrogen oxide in the exhaust gas by reducing the nitrogen oxide to nitrogen and water using a urea solution as a catalyst. The SCR system is currently used mainly for large vehicles such as a truck. Recently, however, the SCR system is expanding its application range to passenger cars. That is, the SCR system is a selective reduction system that injects the urea solution into an exhaust pipe of a vehicle, converts the injected urea solution into ammonia through pyrolysis and hydrolysis, allows the converted ammonia to react with nitrogen oxide in exhaust gas to convert the nitrogen oxide into harmless components such as water and nitrogen, and requires a system for supplying a urea solution.

To this end, a urea solution tank is equipped with a urea solution pump module which sucks and feeds the urea solution contained in the urea solution tank, in which the fed urea solution is injected into an exhaust pipe through an injector.

However, since the urea solution contains a large amount of water, if the SCR system is not operated for a long time in a low temperature state such as the winter season, the urea solution contained in the urea solution tank may be frozen and even the pump portion of the urea solution pump module may be frozen. Therefore, a heater for thawing them is needed.

Therefore, according to the related art, as shown in FIG. 1, a heater 30 is disposed outside a filter 20 surrounding a pump 10 so that a urea solution frozen inwardly from the outside of the filter 20 is thawed. However, since the urea solution frozen in the filter in which the pump is disposed may not be melted until a large amount of urea solution frozen outside the filter is melted, the pump cannot be operated within a rapid time. Korean Patent Laid-Open Publication No. 10-2014-0020035 entitled "urea solution pump unit" is disclosed as the related art.

RELATED ART DOCUMENT

Patent Document

KR 10-2014-0020035 A (Feb. 18, 2014)

SUMMARY

An embodiment of the present invention is directed to providing a urea solution pump module capable of quickly and efficiently thawing a pump and a urea solution frozen around the pump even if the urea solution contained in a urea solution tank is frozen.

In one general aspect, a urea solution pump module includes: a flange portion coupled to cover an opened mounting hole of a urea solution tank; a pump disposed near an upper surface of the flange portion; a filter formed to surround the pump, disposed to be spaced apart from the pump, and coupled to the flange portion; an internal heater disposed between the pump and the filter and coupled to the flange portion; and a first fin having one side connected to the internal heater and the other side disposed near the pump.

The other side of the first fin may be formed to surround a circumference of the pump.

The urea solution pump module may further include: an external heater disposed outside the filter and coupled to the flange portion.

The urea solution pump module may further include: a case coupled to an upper surface of the flange portion, having a space portion formed therein, and coupled to the filter, in which the case may be provided with a receiving portion to communicate with the space portion, and the pump may be coupled to the case so that the pump is disposed in the receiving portion.

The filter may be disposed on one side of a circumferential surface of the case, and a second fin connected to an external heater disposed outside the case may be formed to surround a circumference of the filter.

A partition wall may extend upwardly from a circumferential part of the flange portion, and thus the partition wall may be formed to surround an outer side of the second fin.

The flange portion may be provided with a urea solution delivery channel to which a discharge port of the pump is connected, and the urea solution delivery channel may be provided with a relief valve, such that an outlet of the relief valve is connected to the receiving portion so as to be close to an inlet of the pump.

Other features and aspects will be apparent from the following detailed description, the drawings, and the claims.

| Detailed Description of Main Elements | | | |
|---|---|---|---|
| 1000: | Urea solution pump module | | |
| 100: | Flange portion | | |
| 110: | Partition wall channel | 120: | Urea solution delivery |
| 121: | Delivery pipe | 122: | Connection pipe |
| 123: | Relief valve | | |
| 200: | Pump | | |
| 210: | Inlet | 220: | Discharge port |
| 230: | Motor | | |
| 300: | Filter | | |
| 410: | Internal heater | 411: | First fin |
| 420: | External heater | 421: | Second fin |
| 500: | Case | | |
| 510: | Space portion | 520: | Receiving portion |
| 521: | Through hole | | |
| 10: | Urea solution tank | | |

DETAILED DESCRIPTION OF EMBODIMENTS

Hereinafter, a urea solution pump module according to exemplary embodiments of the present invention as described above will be described below in detail with reference to the accompanying drawings.

Figure 1:
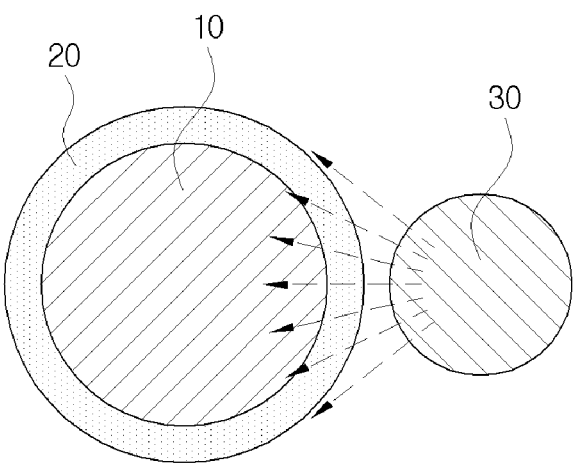
FIG. 1 is a conceptual view showing an arrangement structure of the existing urea solution pump module.
Figure 2:
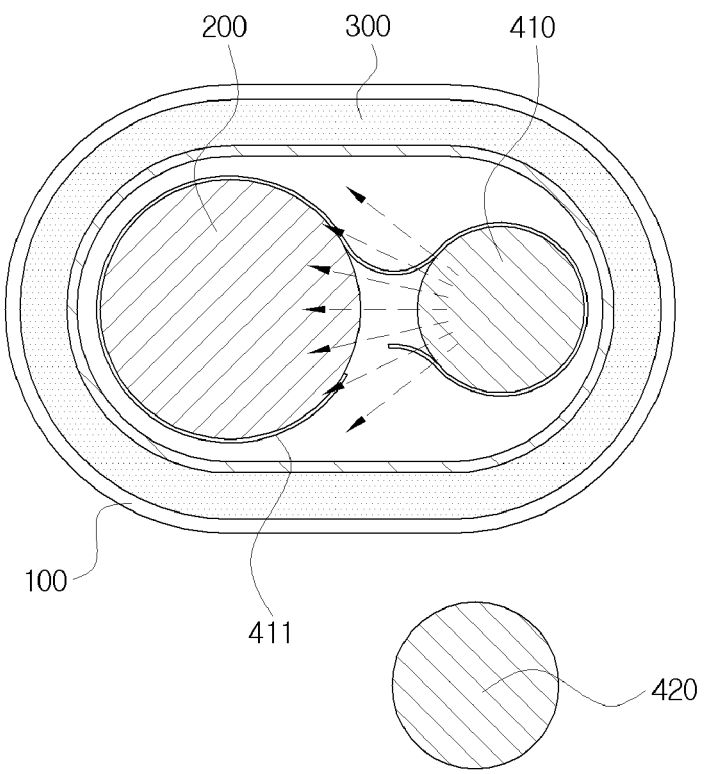
FIGS. 2 and 3 are conceptual views showing an arrangement structure of a urea solution pump module according to an exemplary embodiment of the present invention.
Figure 3:
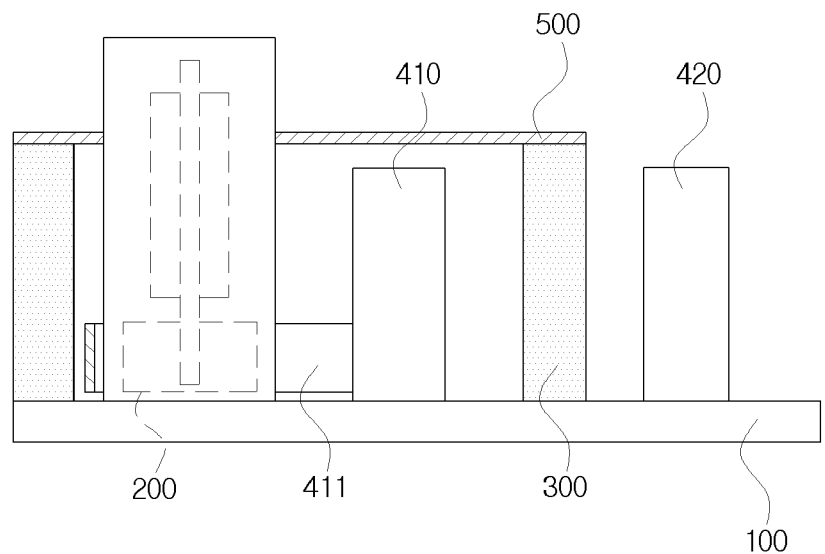

FIGS. 2 and 3 are conceptual views showing an arrangement structure of a urea solution pump module according to an exemplary embodiment of the present invention.

As shown, a urea solution pump module 1000 according to an exemplary embodiment of the present invention may be configured to include: a flange portion 100 coupled to cover an opened mounting hole of a urea solution tank 10; a pump 200 disposed near an upper surface of the flange portion 100; a filter 300 formed to surround the pump 200, disposed to be spaced apart from the pump 200, and coupled to the flange portion 100; an internal heater 410 disposed between the pump 200 and the filter 300 and coupled to the flange portion 100; and a first fin 411 having one side connected to the internal heater 410 and the other side disposed near the pump 200.

Figure 7:
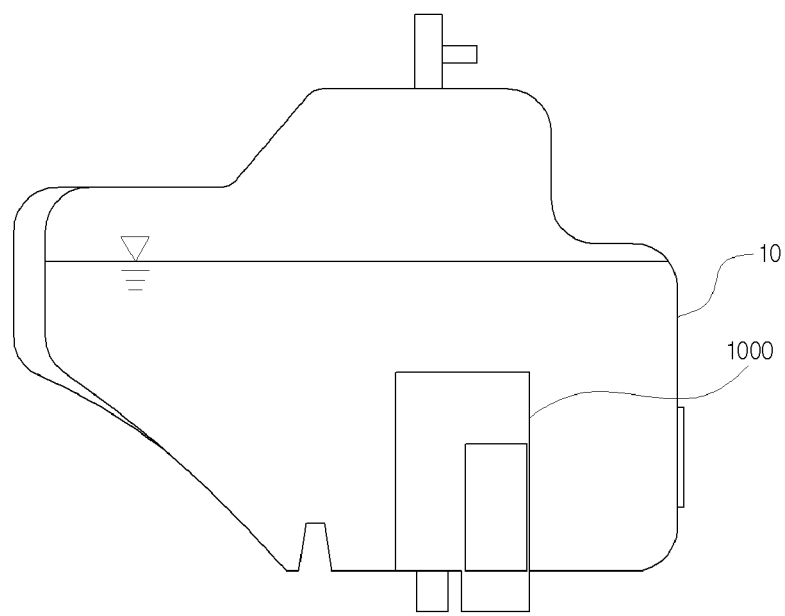
FIG. 7 is a schematic view showing a state in which the urea solution pump module according to the exemplary embodiment of the present invention is equipped in a urea solution tank.

First, the urea solution pump module 1000 may be configured to largely include the flange portion 100, the pump 200, the filter 300, the internal heater 410, and the first fin 411, in which the flange portion 100 may be coupled to the urea solution tank 10 as shown in FIG. 7 in the state in which the pump 200, the filter 300, the internal heater 410, and the first fin 411 are assembled on the flange portion 100. Therefore, the pump 200 may be operated in the state in which the pump 200, the filter 300, the internal heater 410, and the first fin 411 are dipped in the urea solution.

The flange portion 100 may be mounted to the urea solution tank 10 in which the urea solution is received, and the flange portion 100 may be coupled to cover the opened mounting hole of the urea solution tank 10. For example, the urea solution tank 10 may have the mounting hole formed at a lower side thereof so that a circumference of an upper surface of the flange portion 100 may adhere to a lower surface of the urea solution tank 10 in which the mounting hole is formed, and a sealing member may be interposed into or applied to a coupled surface between the flange portion 100 and the urea solution tank 10 for sealing so that the flange portion 100 may adhere to the urea solution tank 10. In addition, the flange portion 100 may be provided with connectors vertically penetrating through both surfaces thereof so that a motor, a heater, or the like for driving of the pump 200 are electrically connected to each other, and thus the connectors may protrude upwardly on the upper surface thereof and the connectors may protrude downwardly on the lower surface thereof.

The pump 200 is disposed on the upper side of the flange portion 100 so that the pump 200 may be disposed near the upper surface of the flange portion 100. At this time, the pump 200 may be configured to suck the urea solution into one side and discharge it to the other side. The pump 200 may be coupled to the motor for driving, and the pump and the motor may be integrally formed.

The filter 300 is formed to surround the pump 200 and is disposed to be spaced apart from the pump 200, and the filter 300 may be coupled to the flange portion 100. That is, the filter 300 may be coupled to the flange portion 100 to form a closed empty space in the filter 300, and the external urea solution may be formed to be introduced into the filter 300 through the filter 300. Therefore, the urea solution passing through the filter 300 to remove its foreign materials may be introduced into the pump 200.

The internal heater 410 is disposed in an empty space in the filter 300 formed by the coupling between the filter 300 and the flange portion 100 and the internal heater 410 may be coupled to the flange portion 100. At this time, the internal heater 410 may be coupled to the connector formed on the upper side of the flange portion 100 to be electrically connected thereto, and the internal heater 410 may be fixed to the upper surface of the flange portion while being coupled to the flange portion 100 by a fastener, or the like.

The first fin 411 may have one side coupled to the internal heater 410 and the other side disposed near the pump 200. Thus, heat generated from the internal heater 410 is quickly transferred to the pump 200, such that the urea solution frozen in the pump 200 and the urea solution frozen at a portion through which the urea solution is introduced into and discharged from the pump 200 and around the portion may be quickly melted. At this time, the first fin 411 may be formed in various shapes and numbers, and the first fin 411 may be formed separately from the internal heater 410 to be coupled thereto or may be integrally formed therewith.

Therefore, the urea solution pump module 1000 according to the exemplary embodiment of the present invention can quickly thaw the urea solution frozen in the pump and around the pump when the urea solution in the urea solution tank is frozen for the winter season to quickly supply the urea solution to the SCR system, and can first melt and use the frozen urea solution in the inner space of the filter in which the pump is disposed, thereby efficiently performing the thawing.

Further, the other side of the first fin 411 may be formed to surround the circumference of the pump 200.

That is, the other side of the first fin 411 extending from the internal heater 410 may be formed to surround an outer circumference of the outer circumferential surface of the pump 200. At this time, the first fin 411 may be disposed to be spaced apart from the outer circumferential surface of the pump 200, and the first fin 411 may be disposed to contact the pump 200.

In addition, the urea solution pump module 1000 may further include an external heater 420 that is disposed outside the filter 300 and coupled to the flange portion 100 and may melt the frozen urea solution outside the filter 300 using the external heater 420.

At this time, like the internal heater 410, the external heater 420 may be coupled to the connector formed on the upper side of the flange portion 100 to be electrically connected thereto, and the external heater 420 may be fixed to the upper surface of the flange portion while being coupled to the flange portion 100 by a fastener, or the like.

Here, the internal heater 410 and the external heater 420 may be operated simultaneously, or the external heater 420 may be operated after the internal heater 410 is operated first.

In addition, the urea solution pump module 1000 may further include a case 500 that is coupled to the upper surface of the flange portion 100, has a space portion 510 formed therein, and is coupled to the filter 300, in which the case 500 may be provided with a receiving portion 520 to communicate with the space portion 510, and the pump 200 may be coupled to the case 500 so that the pump 200 is disposed in the receiving portion 520.

Figure 4:
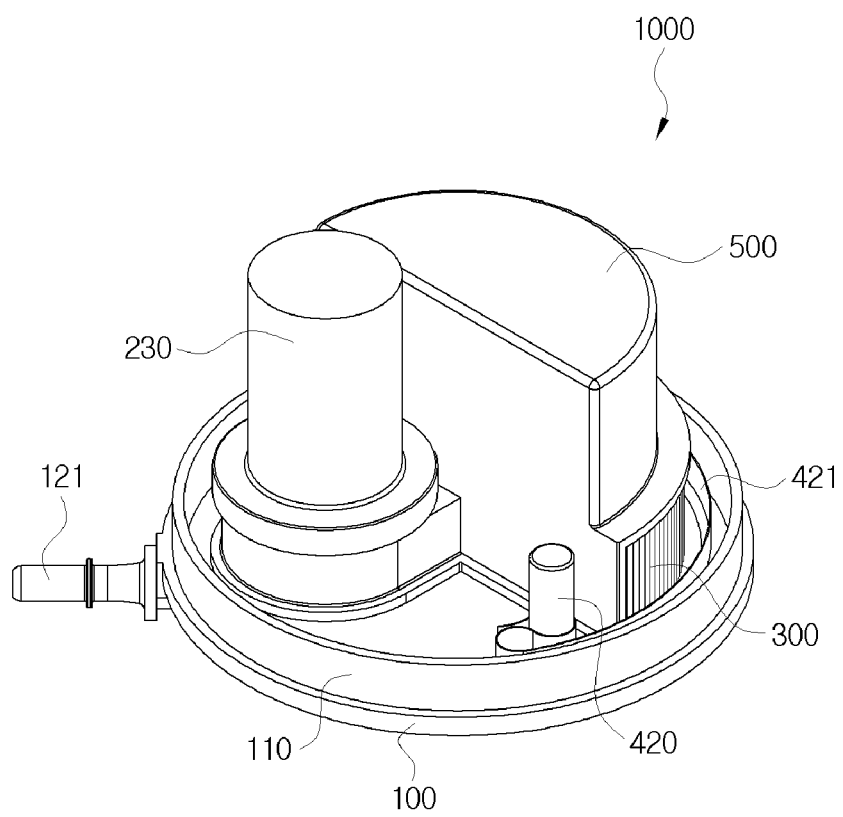
FIGS. 4 to 6 are an assembled perspective view, an exploded perspective view and a front cross-sectional view showing the urea solution pump module according to the exemplary embodiment of the present invention.
Figure 5:
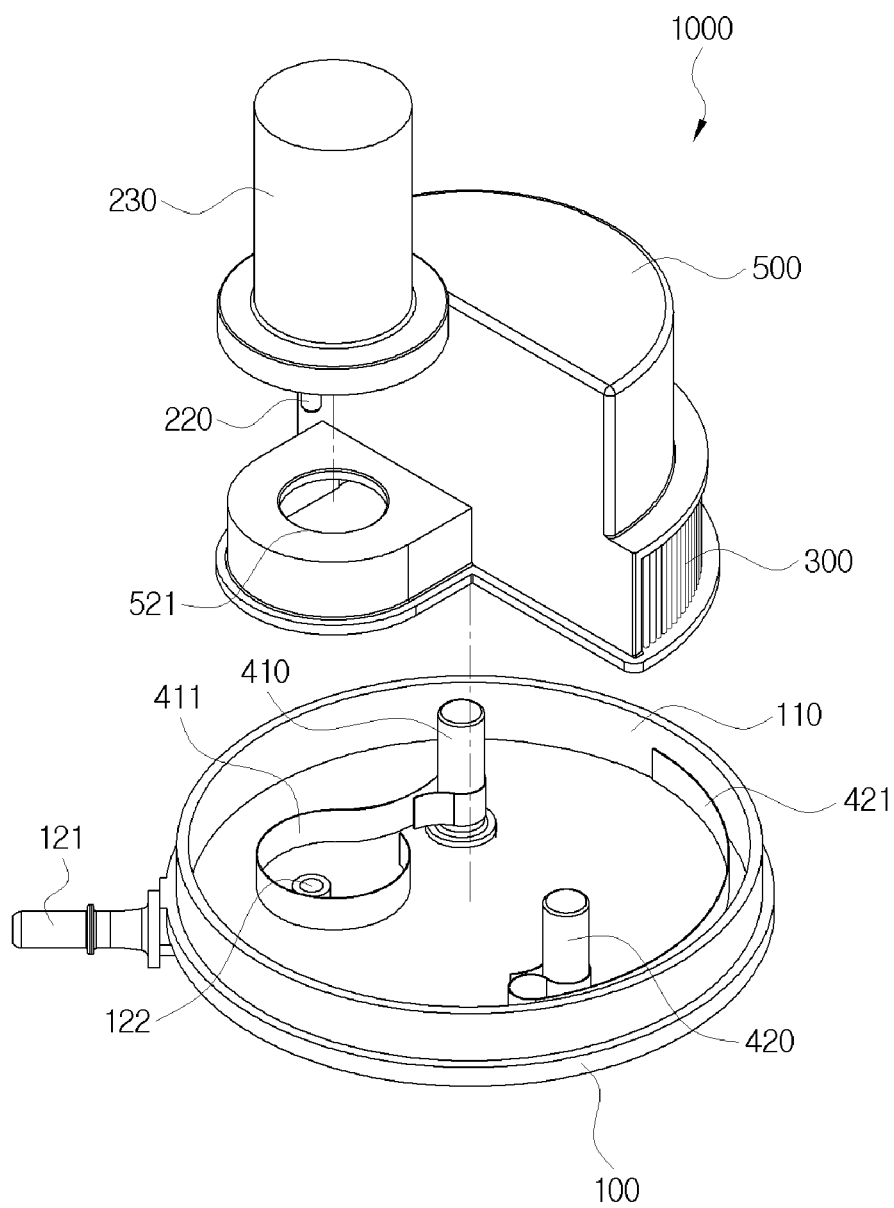
Figure 6:
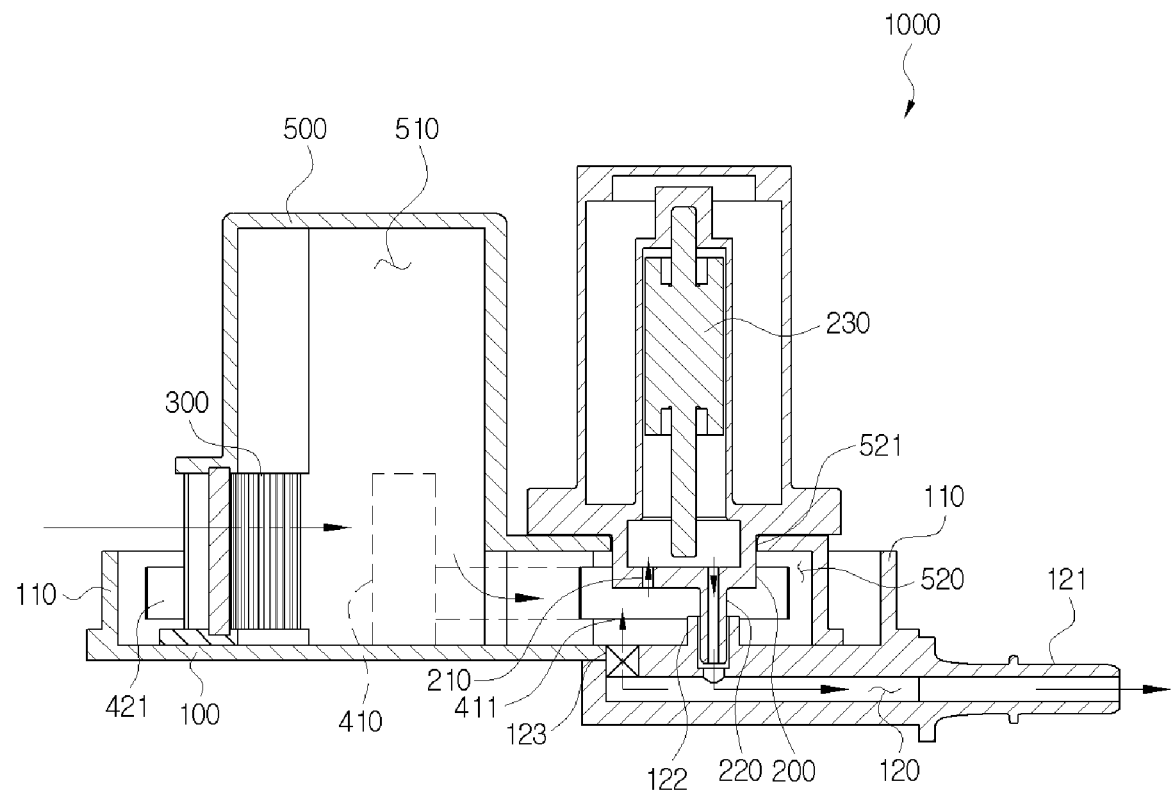

That is, as shown in FIGS. 4 to 6, the case 500 may be formed in a container shape, and the case 500 may have one side coupled to the filter 300. Thus, the case 500 may be coupled to the upper surface of the flange portion 100 with the opened surface of the case 500 in the container shape facing downward. The space portion 510 may be formed in the case 500 by the coupling between the case 500 and the flange portion 100, and the case 500 may be provided with the receiving portion 520 in a protruding shape, with the receiving portion communicating with one side thereof provided with the space portion 510. Thus, the pump 200 is disposed in the receiving portion 520 and the pump 200 may be fixedly coupled to the case 500 of the portion in which the receiving portion 520 is formed. Here, an upper side surface of the case 500 provided with the receiving portion 520 may be provided with a through hole 521 vertically penetrating therethrough, and the pump 200 may be inserted downwardly from above to penetrate through the through hole 521 so that the pump 200 may be disposed in the receiving portion 520. In addition, the motor 230 integrally formed with the pump 200 may be fixedly coupled to the case 500.

The case 500 and the filter 300 may be integrally formed to be formed as a filter case assembly. Alternatively, the filter 300 may be inserted into the case 500 so as to be detachably coupled and fixed thereto.

In addition, the filter 300 is disposed on one side of the circumferential surface of the case 500, and a second fin 421 connected to the external heater 420 disposed outside the case 500 may be formed to surround the circumference of the filter 300.

That is, as shown, the filter 300 may be disposed on one side of the circumferential surface of the case 500 forming the space portion 510, and the filter 300 may be disposed near the upper surface of the flange portion 100. The second fin 421 connected to the external heater 420 may be disposed while being spaced apart from the filter 300 outwardly in a radial direction to surround the circumference of the filter 300. Thus, the filter 300 and the urea solution frozen around the outer side of the filter may be quickly melted by the second fin 421 connected to the external heater 420, such that the urea solution frozen at the outer side of the filter may be first melted to be easily introduced into the space portion 510 that is the inner side of the filter.

In addition, a partition wall 110 may extend upwardly from the circumferential part of the flange portion 100, and thus the partition wall 110 may be formed to surround the outer side of the second fin 421.

That is, as shown, the partition wall 110 protrudes upwardly from the circumferential upper surface of the flange portion 100 to form a cylindrical partition wall 110, and the partition wall 110 may be disposed to surround the lower side of the case 500, the lower side of the filter 300, the lower side of the external heater 420, and the second fin 421. At this time, the partition wall 110 is disposed at a position spaced apart from the second fin 421 outwardly in the radial direction, such that the frozen urea solution between the partition wall 110 and the filter 300 may be melted quickly by the second fin 421. As a result, the frozen urea solution present in the partition wall 110 in the radial direction may be melted first, thereby more efficiently thawing the urea solution.

In addition, the flange portion 100 is provided with a urea solution delivery channel 120 to which a discharge port 220 of the pump 200 is connected, and the urea solution delivery channel 120 is provided with a relief valve 123, such that an outlet of the relief valve 123 may be connected to the receiving portion 520 so as to be close to an inlet 210 of the pump 200.

That is, the urea solution around the pump 200 which is melted by being thawed may be first sucked into the pump 200 to be fed to the SCR system through the urea solution delivery channel 120, and the relief valve 123 is installed on the flange portion 100 to be connected to the urea solution delivery channel 120 so that some of the urea solution may be discharged through the relief valve 123 if the pressure of the urea solution in the urea solution delivery channel 120 rises above a certain pressure. At this time, the inlet of the relief valve 123 is connected to the urea solution delivery channel 120 and the outlet of the relief valve 123 is connected to the receiving portion 520, such that the urea solution discharged through the relief valve 123 may be configured to be discharged to the vicinity of the inlet 210 of the pump 200. Therefore, the urea solution discharged through the relief valve 123 is discharged to the portion where the urea solution is already melted, and therefore the urea solution is easily discharged, such that the relief valve 123 can operate normally. In addition, the melted urea solution is discharged to the vicinity of the inlet 210 of the pump 200, such that the thawed urea solution may be effectively used. As shown, the urea solution delivery channel 120 may be connected to the delivery pipe 121 protruding from the flange portion 100, and a connection pipe 122 protruding upwardly from the upper surface of the flange portion 100 may be formed to be connected to the urea solution delivery channel 120, and the inlet 210 of the pump 200 formed in the pipe shape may be inserted into the connection pipe 122 to be connected thereto.

The urea solution pump module according to the exemplary embodiment of the present invention can quickly thaw the pump and the urea solution frozen around the pump to quickly supply the urea solution to the SCR system.

In addition, when the urea solution discharged from the pump exceeds the preset pressure, the outlet of the relief valve is disposed near the inlet of the pump to discharge the urea solution exceeding the preset pressure, such that the thawed urea solution may be sucked into the pump without being frozen again, thereby efficiently using the thawed urea solution.

The present invention is not limited to the above-mentioned exemplary embodiments but may be variously applied, and may be variously modified by those skilled in the art to which the present invention pertains without departing from the gist of the present invention claimed in the claims.

What is claimed is:
1. A urea solution pump module, comprising:
a flange portion coupled to cover an opened mounting hole of a urea solution tank;

a pump disposed near an upper surface of the flange portion;
a filter formed to surround the pump, disposed to be spaced apart from the pump, and coupled to the flange portion;
an internal heater disposed between the pump and the filter and coupled to the flange portion;
a first fin having one side connected to the internal heater and the other side disposed near the pump; and
a case coupled to an upper surface of the flange portion, having a space portion formed therein, and coupled to the filter,
wherein the case is provided with a receiving portion to communicate with the space portion, and the pump is coupled to the case so that the pump is disposed in the receiving portion.

2. The urea solution pump module of claim 1, wherein the other side of the first fin is formed to surround a circumference of the pump.

3. The urea solution pump module of claim 1, further comprising:
an external heater disposed outside the filter and coupled to the flange portion.

4. The urea solution pump module of claim 1, wherein the filter is disposed on one side of a circumferential surface of the case, and a second fin connected to an external heater disposed outside the case is formed to surround a circumference of the filter.

5. The urea solution pump module of claim 4, wherein a partition wall extends upwardly from a circumferential part of the flange portion, and thus the partition wall is formed to surround an outer side of the second fin.

6. The urea solution pump module of claim 1, wherein the flange portion is provided with a urea solution delivery channel to which a discharge port of the pump is connected, and the urea solution delivery channel is provided with a relief valve, such that an outlet of the relief valve is connected to the receiving portion so as to be close to an inlet of the pump.

* * * * *